United States Patent
Tsukamoto

(10) Patent No.: US 10,690,225 B2
(45) Date of Patent: Jun. 23, 2020

(54) TRANSAXLE

(71) Applicant: KANZAKI KOKYUKOKI MFG.CO., LTD., Amagasaki-shi, Hyogo (JP)

(72) Inventor: Michio Tsukamoto, Morristown, TN (US)

(73) Assignee: KANZAKI KOKYUKOKI MFG.CO., LTD., Hyogo (JP)

( * ) Notice: Subject to any disclaimer, the term of this patent is extended or adjusted under 35 U.S.C. 154(b) by 648 days.

(21) Appl. No.: 15/440,703

(22) Filed: Feb. 23, 2017

(65) Prior Publication Data

US 2017/0248215 A1 Aug. 31, 2017

Related U.S. Application Data

(60) Provisional application No. 62/299,797, filed on Feb. 25, 2016.

(51) Int. Cl.
*F16H 37/08* (2006.01)
*F16H 3/00* (2006.01)

(52) U.S. Cl.
CPC ......... *F16H 37/0813* (2013.01); *F16H 3/006* (2013.01)

(58) Field of Classification Search
CPC .............................. F16H 37/0806; F16H 3/006
See application file for complete search history.

(56) References Cited

U.S. PATENT DOCUMENTS

| 9,765,826 B2* | 9/2017 | Nishimoto | B60K 17/344 |
| 2015/0045184 A1* | 2/2015 | Nishimoto | B60K 23/08 477/75 |
| 2015/0068824 A1* | 3/2015 | Matsuura | B60K 17/105 180/53.4 |
| 2015/0306954 A1* | 10/2015 | Matsuura | B60K 17/3462 180/233 |

\* cited by examiner

*Primary Examiner* — Ha Dinh Ho
(74) *Attorney, Agent, or Firm* — Cantor Colburn LLP

(57) ABSTRACT

A transaxle comprises first and second input shafts coaxial to each other, an output shaft drivingly connected to the second input shaft, a torque limiter interposed between the first and second input shafts, and a housing incorporating the first and second input shafts, the output shaft and the torque limiter. The torque limiter includes first and second sleeves. The first sleeve is fitted to the first input shaft unrotatably relative to the first input shaft. The second sleeve is fitted to the second input shaft unrotatably relative to the second input shaft. The first and second sleeves are layered in a radial direction of the first and second input shafts so as to be pressed against each other with a radial surface pressure to limit a torque transmitted between the first and second sleeves to a limiting value.

9 Claims, 10 Drawing Sheets

TRANSAXLE

CROSS-REFERENCE TO RELATED APPLICATIONS

The present application claims the benefit of priority under 35 U.S.C. § 119(e) based on U.S. Provisional Application Ser. No. 62/299,797 filed on Feb. 25, 2016, the entire content of which is also incorporated herein by reference.

FIELD

At least one embodiment of this disclosure relates to a transaxle, especially, a front transaxle for a four-wheel driving vehicle called "utility vehicle".

BACKGROUND

As disclosed by US 2015/0045184 A1, there is a well-known conventional four-wheel driving vehicle, called "utility vehicle" (hereinafter referred to as "UTV"), equipped with a power train including an engine and front and rear transaxles. The engine and the rear transaxle are disposed at a rear portion of the UTV. The rear transaxle carrying right and left rear wheels is drivingly connected to the engine via a belt type continuously variable transmission (hereinafter referred to as "CVT"), for example, so as to receive power from the engine via the CVT.

The rear transaxle further includes a power take-off (hereinafter referred to as "PTO") unit so as to distribute the power from the engine to the right and left rear wheels and the PTO unit. The front transaxle carrying right and left front wheels is disposed at a front portion of the UTV, and includes an input shaft for receiving power from the PTO unit of the rear transaxle so as to distribute the power to the right and left front wheels.

A driving mode selection clutch is provided on the input shaft of the front transaxle. The driving mode selection clutch is selectively engaged to transmit power from the PTO unit of the rear transaxle to the right and left front wheels, or disengaged to isolate the right and left front wheels from the power from the PTO unit.

The drive mode selection clutch is manually operable so that the selection of whether the UTV travels in a four-wheel drive (hereinafter, referred to as "4WD") mode or a two-wheel drive (hereinafter, referred to as "2WD") mode depends on a driver's option.

The UTV is often used to travel over undulating terrain. In this case, a driver tends to set the UTV in the 4WD mode so as to ensure running performance by driving all of the four wheels. However, during such a traveling, the UTV may repeat jumping and landing.

When the UTV lands, falling and landing of the front wheels precedes falling and landing of the rear wheels. Especially, the moment the UTV lands by only the front wheels preceding the rear wheels, a heavy load from the earth is suddenly applied to the front wheels, and backflows to stress the entire power train.

Therefore, it is desirable that when the UTV jumps, the engaged drive mode selection clutch is instantly disengaged to make the front wheels free from the driving power from the PTO unit before the vehicle lands with the front wheels.

However, it is difficult for a driver to make such instant decision and operation to disengage the clutch each time the UTV jumps. Here, it may be conceivable that the UTV is equipped with an electronic control system for automatically controlling an actuator for switching the drive mode selection clutch based on detection of jumping and landing of the vehicle, however, such a system will be complicated and expensive.

SUMMARY

A first transaxle according to this application comprises a first input shaft, a second input shaft, an output shaft, a torque limiter, and a housing. The second input shaft is extended coaxially to the first input shaft. The output shaft is drivingly connected to the second input shaft. The torque limiter is interposed between the first input shaft and the second input shafts. The housing incorporates the first and second input shafts, the output shaft and the torque limiter. The first sleeve is connected to the first input shaft unrotatably relative to the first input shaft. The second sleeve is connected to the second input shaft unrotatably relative to the second input shaft. The torque limiter is configured such that the first and second sleeves are layered in a radial direction of the first and second input shafts and contact and press each other with a radial surface pressure therebetween to limit a torque transmitted between the first and second sleeves to a limiting value.

Therefore, a first advantage of the first transaxle is that the first transaxle is adaptable as a front transaxle of a four-wheel vehicle such as a UTV to travel over undulating terrain, for example, due to the torque limiter to protect a power train of the vehicle from an overload received from a drive wheel drivingly connected to the output shaft.

Further, a second advantage of the first transaxle is that the torque limiter including only the first and second sleeves is a simple assembly. Such a simple assembly is advantageous in facilitating its installation and removal into and from the housing, minimizing the housing incorporating the torque limiter, and reducing costs.

Further, a third advantage of the first transaxle is that, since the housing protects the torque limiter therein from mud and so on outside of the housing, the torque limiter is prevented from being rusted or contaminated with foreign material entering a narrow gap between the first and second sleeves, thereby keeping its proper performance for a long time.

Preferably, in the first transaxle, the torque limiter is shiftable in an axial direction of the first and second input shafts between a first position and a second position while the radial surface pressure keeps the first and second sleeves from moving relative to each other in the axial direction of the first and second input shafts. When the torque limiter is located at the first position, the first sleeve is connected to the first input shaft unrotatably relative to the first input shaft, and the second sleeve is connected to the second input shaft unrotatably relative to the second input shaft. When the torque limiter is located at the second position, both the first and second sleeves are separated from one of the first and second input shafts so as to be rotatable relative to the one of the first and second input shafts.

Therefore, the torque limiter also serves as a clutch shifter slidable along the first and second input shafts so as to enable a driver's optional selection of setting a four-wheel driving vehicle equipped with the first transaxle into a two-wheel driving (2WD) mode. Further, during the shift of the torque limiter, the first and second sleeves are kept from moving axially relative to each other so as to keep its configuration as an assembly serving as both the torque limiter and the clutch shifter.

A second transaxle according to this application comprises a first input shaft, a second input shaft, an output shaft, a sleeve, and a housing. The second input shaft is extended coaxially to the first input shaft. The output shaft is drivingly connected to the second input shaft. The housing incorporates the first and second input shafts, the output shaft and the sleeve. The first input shaft is fitted into the sleeve so that the first input shaft and the sleeve are layered in a radial direction of the first input shaft and contact each other with a radial surface pressure therebetween to limit a torque transmitted between the first input shaft and the sleeve to a limiting value.

Therefore, a first advantage of the second transaxle is that the second transaxle is adaptable as a front transaxle of a four-wheel vehicle such as a UTV to travel over undulating terrain, for example, due to the first input shaft and the sleeve serving as a torque limiter to protect a power train of the vehicle from an overload received from a drive wheel drivingly connected to the output shaft.

Further, a second advantage of the second transaxle is that the first input shaft and the sleeve serving as the torque limiter are assembled into a simple assembly. Further, since the first input shaft serves as a part of the torque limiter, only the sleeve is an additional member for constituting the torque limiter, thereby reducing the number of component members and costs. Such a simple assembly including the first input shaft and the sleeve is advantageous in facilitating its installation and removal into and from the housing, minimizing the housing incorporating the assembly, and reducing costs.

Further, a third advantage of the second transaxle is that, since the housing protects the assembly serving as a torque limiter therein from mud and so on outside of the housing, the assembly is prevented from being rusted or contaminated with foreign material entering a narrow gap between the first input shaft and the sleeve, thereby keeping its proper performance as the torque limiter for a long time.

Preferably, the second transaxle further comprises first and second clutch members disposed in the housing. The first clutch member is connected to one of the sleeve and the second input shaft unrotatably relative to the one of the sleeve and the second input shaft. The second clutch member is connected to the other of the sleeve and the second input shaft unrotatably relative to the other of the sleeve and the second input shaft. One of the first and second clutch members is immovable in the axial direction of the first and second input shafts. The other of the first and second clutch members is movable in the axial direction of the first and second input shafts so as to be shiftable between a clutch-on position to engage the first and second clutch members with each other and a clutch-off position to disengage the first and second clutch members from each other.

Therefore, the sleeve serving as a part of the torque limiter also serves as a base for mounting either the first or second clutch member thereon, thereby reducing the number of additional component members for constituting a clutch including the first and second clutch members, and reducing a space for arranging such additional component members so as to ensure a compactness of the housing incorporating the first and second clutch members.

Preferably, in the second transaxle, the limiting value is adjustable by changing an axial insertion degree of the first input shaft into the sleeve.

The change of the axial insertion degree of the first input shaft into the sleeve means change of an area of surfaces of the first input shaft and the sleeve pressed against each other. Therefore, due to such a simple manner, the limiting value defining a capacity of the torque limiter constituted by the first input shaft and the sleeve can be adjusted easily, so that the second transaxle can easily obtain a required performance of treating a load that the sleeve receives from the output shaft via the second input shaft.

A third transaxle according to this application comprises a first input shaft, a second input shaft, an output shaft, and a clutch shifter. The second input shaft is extended coaxially to the first input shaft. The output shaft is drivingly connected to the second input shaft. The clutch shifter includes first and second members. The clutch shifter is shiftable between a clutch-on position and a clutch-off position. When the clutch shifter is set at the clutch-on position, the first member is drivingly connected to the first input shaft, the second member is drivingly connected to the second input shaft, and the first and second members engage with each other by a mechanical force such as to limit a torque transmitted between the first and second members to a limiting value. When the clutch shifter is set at the clutch-off position, both the first and second members are drivingly isolated from one of the first and second input shafts.

Therefore, for example, on an assumption that a four-wheel driving vehicle is equipped with the third transaxle serving as a front transaxle carrying front wheels, the four-wheel driving vehicle can travel in a two-wheel drive (2WD) mode with driving only rear wheels according to a driver's optional setting of the clutch shifter at the clutch-off position.

Additionally, even during travel of the four-wheel driving vehicle set in a four-wheel drive (4WD) mode with driving all the front and rear wheels according to a driver's optional setting of the clutch shifter at the clutch-on position, when the front wheels receive an excessive backing load, the first and second input shafts become rotatable relative to each other automatically so that the 2WD mode of the four-wheel driving vehicle is instantly realized, thereby protecting the first input shaft and a power train upstream of the first input shaft, e.g., an engine and a rear transaxle carrying the rear wheels, from the backing load.

Moreover, the clutch shifter has a simple and economic structure because it uses the mechanical force to ensure the torque limiter function, instead of a complicated and expensive control system including an actuator using a hydraulic pressure, an air pressure, an electricity or so on.

As mentioned above, the third transaxle, including a clutch shifter, is configured such that, even if the clutch shifter is set to transmit power received by an input shaft of the transaxle from an upstream side of the input shaft to a drive wheel carried by the transaxle, a driving condition of the third transaxle can be automatically instantly shifted to protect the upstream side of the input shaft from an overload of the drive wheel when the drive wheel receives the overload from the earth.

Preferably, in the third transaxle, one of the first and second members is inserted into the other of the first and second members so that the first and second members are pressed against each other by a pressure in a radial direction of the first and second input shafts serving as the mechanical force.

Therefore, such a simple structure of the first and second members generates the mechanical force for ensuring the torque limiter function of the clutch shifter. The first and second members possess the mutual radial pressure in themselves only by tightly inserting the first member into the second member, thereby saving components of the clutch shifter in number and cost.

For example, the setting of the radial pressure mutually applied to the first and second members can rely on determination of material of the first and second members or dimensioning of the first and second members.

Alternatively, preferably, in the third transaxle, the first and second members are pressed against each other by a pressure in an axial direction of the first and second input shafts serving as the mechanical force.

Therefore, the axial pressure mutually pressing the first and second members can be generated by adding a simple and economic component member to the first and second members.

Further preferably, the clutch shifter further includes a friction member and a biasing member. The friction member is interposed between axial end surfaces of the first and second sleeves. The biasing member biases the first and second sleeves toward each other via the friction member.

Therefore, the biasing member generates the axial pressure mutually applied to the first and second members, and due to the friction member, the first and second members are frictionally pressed against each other so as to limit a torque transmitted between the first and second members to a limiting value.

The setting of the axial frictional pressure mutually applied to the first and second members can rely on selection of appropriate members serving as the friction member and the biasing member, dimensioning of a gap between the axial end surfaces of the first and second members or a space for locating the biasing member, or determination in number of the friction member or the biasing member, for example. As a result, the axial frictional pressure can easily be adjusted.

These and other features and advantages of the embodiments will appear more fully from the following detailed description with reference to the attached drawings.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
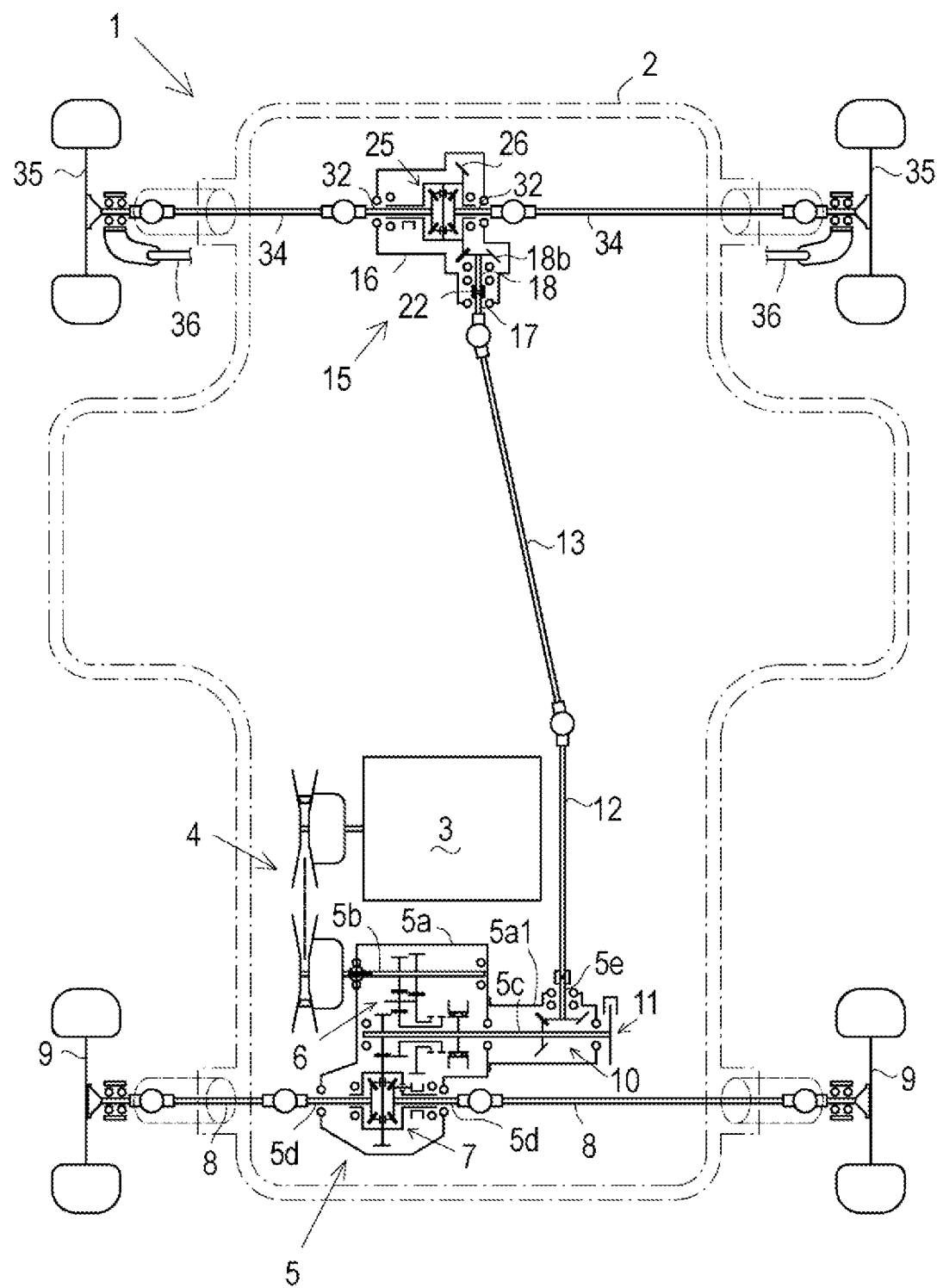
FIG. 1 is a schematic plan view of an entire utility vehicle (UTV).

Referring to FIG. 1, an entire structure of a utility vehicle (hereinafter, referred to as "UTV") 1 will be described.

UTV 1 includes a vehicle body frame (chassis) 2 extended from a front end thereof to a rear end thereof. A rear portion of vehicle body frame 2 supports an engine 3 and a rear transaxle 5 rearward from engine 3.

Engine 3 includes an input shaft 3a projecting leftward or rightward (in this embodiment, leftward) therefrom. Rear transaxle 5 includes a housing 5a from which an input shaft 5b projects leftward or rightward in the same direction as input shaft 3a (in this embodiment, leftward). A belt type continuously variable transmission (hereinafter, referred to as "CVT") 4 is interposed between output shaft 3a and input shaft 5b. Therefore, a rotary power of output shaft 3a of engine 3 is steplessly speed-changed by CVT 4, and then is transmitted to input shaft 5b of rear transaxle 5.

Rear transaxle 5 includes a counter shaft 5c extended in housing 5a and parallel to input shaft 5b. A forward traveling gear train and a backward traveling gear train are interposed between input shaft 5b and counter shaft 5c so as to serve as a reverser unit 6.

Further, a differential unit 7 is disposed in housing 5a so as to differentially connect left and right differential yoke shafts 5d to each other. Differential unit 7 receives power from counter shaft 5c serving as an output shaft of reverser unit 6 and distributes the power between left and right differential yoke shafts 5d. Left and right differential yoke shafts 5d are drivingly connected via respective propeller shafts 8 to respective left and right rear wheels 9 suspended at left and right ends of the rear portion of vehicle body frame 2.

Housing 5a includes a PTO housing 5a1 at a portion thereof (in this embodiment, a right portion of housing 5a) laterally opposite the lateral projection side of input shaft 5b. A PTO shaft 5e is journalled in PTO housing 5a1 and projects forward from PTO housing 5a1. Counter shaft 5c serving as the output shaft of reverser unit 6 is extended into PTO housing 5a1. In PTO housing 5a1, bevel gears mesh with each other to drivingly connect the extended portion of counter shaft 5c to PTO shaft 5e.

PTO housing 5a1, the extended portion of counter shaft 5c, the bevel gears and PTO shaft 5e constitute a PTO unit 10. An end portion of counter shaft 5c projects outward from PTO housing 5a1 so as to be provided thereon with a parking brake 11.

In this way, rear transaxle 5 is configured so as to distribute the rotary power of input shaft 5b driven by engine 3 via CVT 4 between differential unit 7 for driving left and right rear wheels 9 and PTO unit 10 for driving later-discussed left and right front wheels 35.

A front portion of vehicle body frame 2 supports a front transaxle 15. A first input shaft 17 projects rearward from a housing 16 of front transaxle 15 at the lateral center portion of vehicle body frame 2.

A propeller shaft 12 is extended coaxially from PTO shaft 5e at a right side of engine 3 laterally opposite CVT 4. A propeller shaft 13 is interposed via universal joints between a front end of propeller shaft 12 and a rear end of first input shaft 17. Therefore, power is transmitted from PTO shaft 5e to first input shaft 17 via propeller shafts 12 and 13.

A housing 16 of front transaxle 15 incorporates first input shaft 17, a second input shaft 18, and a torque limiter 22 in a rear portion thereof. Second input shaft 18 is extended coaxially forward from first input shaft 17. Torque limiter 22 connects first and second input shafts 17 and 18 mutually so that first and second input shafts 17 and 18 are normally unrotatable relative to each other.

Housing 16 incorporates an ordinary bevel-gear type differential unit 25 in a front portion thereof. A bevel ring gear 26 serving as an input gear of differential unit 25 meshes with a bevel pinion 18$b$ formed or fixed on a front end of second input shaft 18. Differential unit 25 differentially connects left and right differential yoke shafts 32 to each other.

Left and right differential yoke shafts 32 project leftward and rightward from housing 16 and are connected via respective propeller shafts 34 to respective left and right front wheels 35 suspended at left and right ends of the front portion of vehicle body frame 2.

Left and right front wheels 35 are steerable wheels that are connected to each other by a tie rod 36 so as to be able to turn together laterally relative to vehicle body frame 2.

Referring to FIGS. 2 to 10, description will now be given of concrete structures of transaxle 15 and alternative transaxles 15A, 15B, 15C and 15D, which are adaptable as a front transaxle of UTV 1 shown in FIG. 1. In this regard, representative transaxle 15 is illustrated in FIG. 1 as being adapted as front transaxle 15 of UTV 1.

Figure 2:
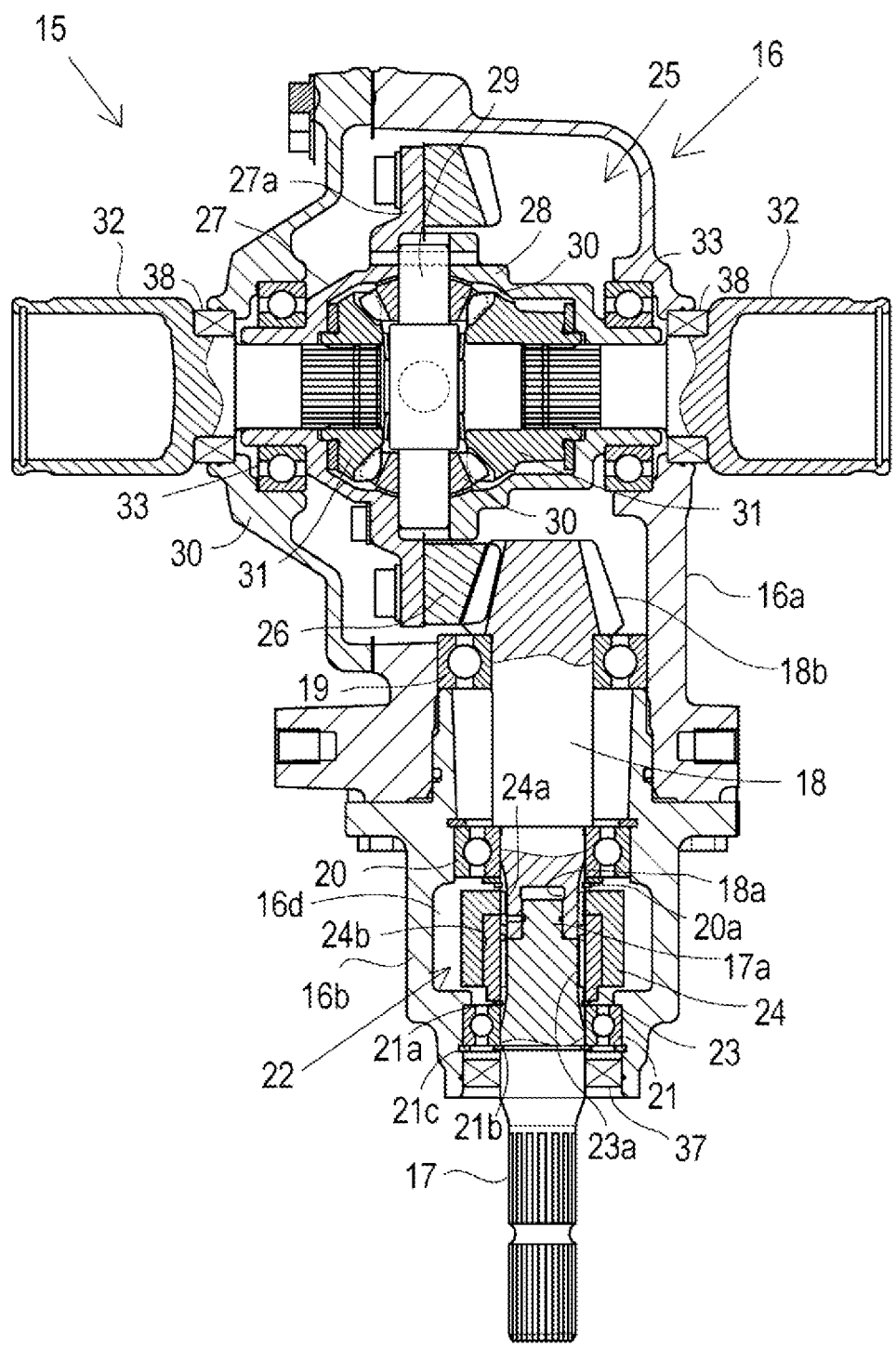
FIG. 2 is a sectional plan view of a transaxle according to a first embodiment incorporating a torque limiter.

Referring to FIG. 2, transaxle 15 will be described.

Housing 16 includes a main housing member 16$a$, a side cover member 16$b$ and an input housing member 16$c$, which are assembled and joined together. A front portion of main housing 16$a$ incorporates a main portion of differential unit 25, and journals one of left and right differential yoke shafts 32 (in this embodiment, right differential yoke shaft 32) at one of left and right sides (in this embodiment, a right side) thereof via a bearing 33.

The front portion of main housing member 16$a$ has an opening at the other of the left and right sides thereof portions, so that differential unit 25 can be installed or removed into and from main housing member 16$a$ via the opening.

Side cover member 16$b$ is joined to main housing member 16$a$ so as to cover this opening, and journals the other of left and right differential yoke shafts 32 (in this embodiment, left differential yoke shaft 32) via another bearing 33.

Differential unit 25 includes a differential casing formed by joining left and right differential casing members 27 and 28 to each other. Differential casing member 27 is formed with a flange 27$a$, and bevel ring gear 26 is fixed on flange 27$a$. Differential casing members 27 and 28 are fitted on respective differential yoke shafts 32 so as to be journalled together with respective differential yoke shafts 32 by main housing member 16$a$ and side cover member 16$b$ via respective bearings 33.

Fluid seals 38 are interposed between outer circumferential surfaces of right and left differential yoke shafts 32 and inner circumferential surfaces of housing members 16$a$ and 16$b$, respectively, so as to seal right and left distal end openings of housing members 16$a$ and 16$b$ through which right and left differential yoke shafts 32 are passed.

Therefore, fluid seals 38 prevent fluid in the front portion of housing 16 incorporating differential unit 25 from leaking to the outside of housing 16 via bearings 33. Also, fluid seals 38 prevent the fluid in the front portion of housing 16 and differential unit 25 submerged in the fluid from being contaminated with foreign matters, such as mud, outside of housing 16.

Differential casing members 27 and 28 sandwich a differential pinion shaft 29 therebetween. Bevel differential pinions 30 are provided on differential pinion shaft 29 in the differential casing as joined differential casing members 27 and 28. In the differential casing, proximal end portions of differential yoke shafts 32 are fixedly provided thereon with respective differential side gears 31, so that each bevel differential pinion 30 meshes with both left and right differential side gears 31 at left and right sides thereof.

Main housing member 16$a$ has an opening at a rear end portion thereof. Input shaft housing member 16$c$ is joined to the rear end portion of main housing member 16$a$ so as to close this opening. A front portion of input shaft housing member 16$c$ is fitted into the opening at the rear end portion of main housing member 16$a$. Second input shaft 18 is extended in the fore-and-aft direction of UTV 1 and is journalled in the front portion of input shaft housing member 16$c$ via a front bearing 19 and a rear bearing 20.

The front end of second input shaft 18, having bevel pinion 18$b$ formed (or fixed) thereon, projects from a front end of input shaft housing member 16$c$ into main housing member 16$a$, and meshes with a rear end portion of bevel ring gear 26. Therefore, second input shaft 18 is drivingly connected via differential unit 25 to differential yoke shafts 32 serving as output shafts of transaxle 15.

First input shaft 17 is journalled at an axial intermediate portion thereof by a rear end portion of input shaft housing member 16$c$ via a bearing 21, and projects at a rear portion thereof rearward from the rear end portion of input shaft housing member 16$c$.

A torque limiter chamber 16$d$ is formed in a rear portion of input shaft housing member 16$c$ between bearings 20 and 21. In torque limiter chamber 16$d$, a diametrically small projection 17$a$ is formed on a front end of first input shaft 17, and a rearwardly open recess 18$a$ is formed in a rear end portion of second input shaft 18. Projection 17$a$ is fitted into recess 18$a$ so that first and second input shafts 17 and 18 are connected coaxially to each other and rotatably relative to each other. Torque limiter 22 is disposed on first and second input shafts 17 and 18 in torque limiter chamber 16$d$.

First input shaft 17 is fixedly provided on an outer circumferential portion thereof rearward from torque limiter chamber 16$d$ with a front retaining ring 21$a$ contacting a front end of bearing 21, and with a rear retaining ring 21$b$ contacting a rear end of bearing 21. A spacer 21$c$ is fixed onto an inner circumferential rear portion of input shaft housing member 16$c$ along the rear end of bearing 21.

A fluid seal 37 is disposed rearward from spacer 21$c$ and is interposed between an inner circumferential surface of input shaft housing member 16$c$ and an outer circumferential surface of first input shaft 17 so as to seal a rear end opening of housing 16 through which first input shaft 17 is passed.

Therefore, fluid seal 37 prevents fluid in torque limiter chamber 16$d$ incorporating torque limiter 60 from leaking to the outside of housing 16, and prevents the fluid and torque limiter 22 in torque limiter chamber 16$d$ from being contaminated with foreign matters, such as mud, outside of housing 16.

In torque limiter chamber 16$d$, first and second input shafts 17 and 18 are splined on outer circumferential portions thereof. Torque limiter 22 includes a first sleeve 23 formed with a splined inner circumferential portion 23$a$, which is spline-fitted on the splined outer circumferential portion of first input shaft 17.

A front portion of first sleeve 23 is extended forward from the front end of first input shaft 17 except projection 17$a$ so as to cover a rear end outer circumferential portion of second input shaft 18. This front portion of first sleeve 23 is not splined at an inner circumferential portion thereof extended forward from splined inner peripheral portion 23$a$, so that it is not spline-fitted to second input shaft 18. Therefore, first sleeve 23 is not rotatable relative to first input shaft 17 but is rotatable relative to second input shaft 18.

Torque limiter 22 includes a second sleeve 24 whose front portion is formed with a splined inner circumferential portion 24a that is spline-fitted on the splined outer circumferential portion of second input shaft 18.

An inner circumferential portion of second sleeve 24 extended rearward from splined inner circumferential portion 24a defines a rearwardly open recess 24b that is diametrically larger than splined inner circumferential portion 24a. First sleeve 23 is inserted forward into recess 24b of second sleeve 24 so that an outer circumferential surface of first sleeve 23 contacts an inner circumferential surface of second sleeve 24 in recess 24b.

Here, first sleeve 23 is tightly fitted in second sleeve 24 so as to be pressed at an outer circumferential surface thereof against an inner circumferential surface of second sleeve 24. Therefore, first and second sleeves 23 and 24 are assembled into a subassembly serving as torque limiter 22, which is formed as a single ordinary coupling collar in appearance, before the subassembly serving as torque limiter 22 is installed in housing 16.

In the completed subassembly serving as torque limiter 22, the outer circumferential surface of first sleeve 23 and the inner circumferential surface of second sleeve 24 in recess 24b contacting each other apply a pressure to each other in the radial directions of first and second input shafts 17 and 18 (hereinafter, simply referred to as "radially (or radial)"). In brief, first and second sleeves 23 and 24 are radially layered and contact and press each other with a radial surface pressure therebetween.

The radial surface pressure limits a torque transmitted between first and second sleeves 23 and 24 to a limiting value. Once a torque transmitted between first and second sleeves 23 and 24 is suddenly increased by a load applied to second sleeve 24 from differential yoke shafts 32 serving as output shafts of transaxle 15 and exceeds the limiting value defined by the radial surface pressure, first and second sleeves 23 and 24 rotate relative to each other to interrupt transmission of an engine torque from first sleeve 23 to second sleeve 24. Otherwise, first and second sleeves 23 and 24 are bound together unrotatably relative to each other so as to transmit power from first input shaft 17 to second input shaft 18.

As the radial surface pressure is increased, the limiting value of torque is increased. As the limiting value is increased, a capacity of torque limiter 22 for allowing a torque transmitted therethrough is increased. Therefore, in the step where first and second sleeves 23 and 24 are assembled to complete the subassembly serving as torque limiter 22, the radial surface pressure between first and second sleeves 23 and 24 is adjusted to obtain a required limiting value of torque corresponding to an engine torque or the like.

For example, on an assumption that second sleeve 24 has an elasticity such as to be expandable by the centrifugal radial pressure from first sleeve 23, the adjustment of radial pressure may rely on what is material of second sleeve 24 causing the elasticity, or may rely on how much difference exists between an outer diameter of first sleeve 23 and an inner diameter of second sleeve 24 before sleeve 23 is pressed into second sleeve 24.

Further, referring to a later-discussed torque limiter 60 in alternative transaxle 15C with reference to FIG. 9, an axial insertion degree of first sleeve 23 into recess 24b of sleeve 24 may be adjusted to adjust an area where the radial surface pressure is applied between first and second sleeves 23 and 24.

Due to torque limiter 22 having the above-mentioned structure, unless a torque transmitted between first and second sleeves 23 and 24 increased exceeds the limiting value, a power of engine 3 (an engine torque) transmitted to first input shaft 17 is transmitted to second input shaft 18 via first and second sleeves 23 and 24 of torque limiter 22 bound together unrotatably relative to each other, and is distributed between left and right front wheels 35 via differential unit 25. Therefore, UTV1 equipped with transaxle 15 serving as a front transaxle travels by four-wheel driving (hereinafter referred to as "4WD"), i.e., by driving rear wheels 9 and front wheels 35.

During travel of UTV 1 over an undulating terrain, for example, when utility vehicle 1 jumps and lands by front wheels 35, front wheels 35 receive a large load from the earth such as to increase a torque transmitted between the first and second sleeves 23 and 24. Once the torque transmitted between first and second sleeves 23 and 24 exceeds the limiting value, first and second sleeves 23 and 24 become rotatable relative to each other against the radial surface pressure so as to interrupt transmission of the engine torque from first input shaft 17 to second input shaft 18, thereby protecting first sleeve 23, first input shaft 17 spline-fitted to first sleeve 23, and the power train upstream of first input shaft 17 from the overload from front wheels 36.

In other words, during the 4WD travel of UTV 1, only when an excessive load is applied to front wheels 35, torque limiter 25 functions to automatically, instantly and temporarily realize a two-wheel driving (hereinafter referred to as "2WD") travel of UTV 1, thereby protecting the power train including engine 3, CVT 4 and rear transaxle 5 from the load applied from front wheels 35 to front transaxle 15.

Further, even if housing 16, first input shaft 17 and others are splashed with mud during travel of utility vehicle 1 in a muddy place, the inside of housing 16 is safe from the mud unless any of fluid seals 37 and 38 is defective. In this way, housing 16 protects torque limiter 22 therein from mud or so on, thereby preventing torque limiter 22 from being rusted or contaminated with foreign material. Therefore, a proper performance of torque limiter 22 is maintained for a long time.

Moreover, the radial pressure mutually applied to sleeves 23 and 24 also functions to keep sleeves 23 and 24 from moving relative to each other in the axial direction of first and second input shafts 17 and 18 (hereinafter, simply referred to as "axially" (or "axial")).

Further, retaining ring 21a is fixed on first input shaft 17 in a gap between the front end of bearing 21 and a rear end of first sleeve 23 so as to hinder first sleeve 23 from moving rearward, and a retaining ring 20a is fixed on second input shaft 18 in a gap between a rear end of bearing 20 and a front end of second sleeve 24 so as to hinder second sleeve 24 from moving forward, thereby preventing sleeves 23 and 24 from moving together axially along first and second input shafts 17 and 18.

Alternatively, torque limiter 22 may be configured such that an outer diameter of first sleeve 23 spline-fitted to rear first input shaft 17 is larger than that of second sleeve 24 spline-fitted to front second input shaft 18, and such that second sleeve 24 is inserted rearward into a forwardly open recess formed in first sleeve 23.

Figure 3:
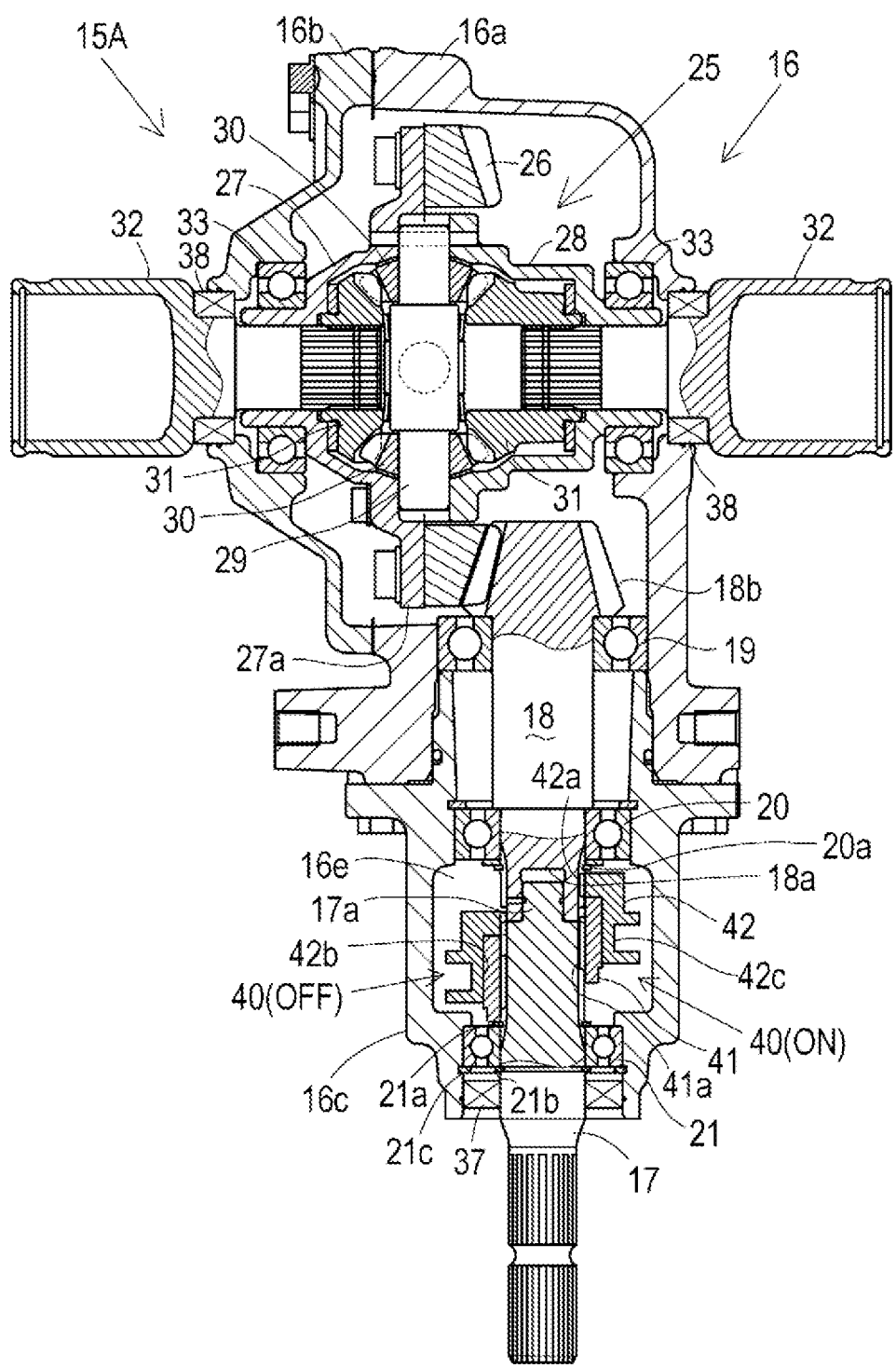
FIG. 3 is a sectional plan view of a transaxle according to a second embodiment incorporating a clutch shifter including a torque limiter.
Figure 4:
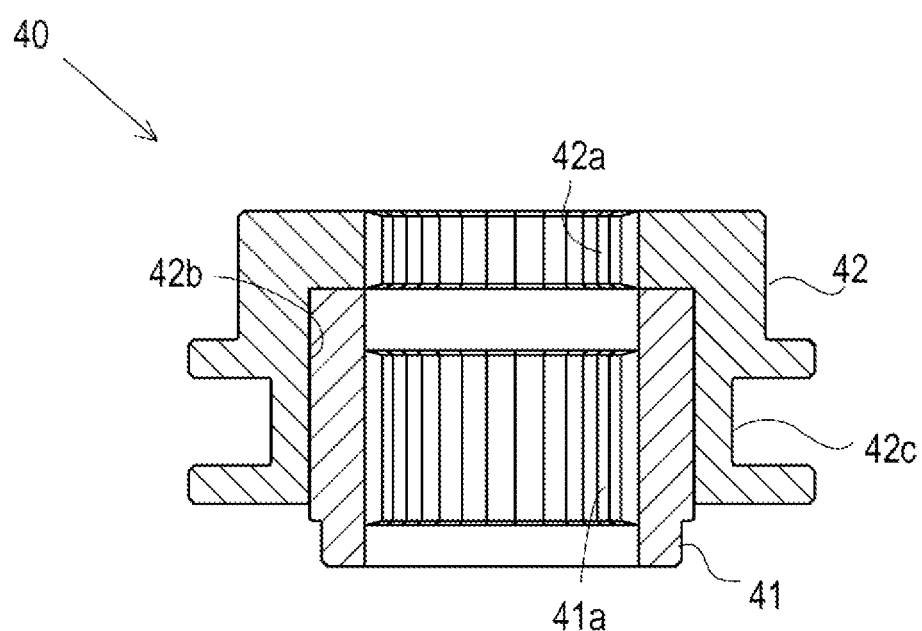
FIG. 4 is an enlarged sectional plan view of the clutch shifter shown in FIG. 3.

Referring to FIGS. 3 and 4, transaxle 15A will be described.

Transaxle 15A is substantially identical to transaxle 15 of FIG. 2, except that transaxle 15A includes a clutch shifter 40 having a torque limiter configured similar to torque limiter 22.

Clutch shifter 40 includes a first sleeve 41 and a second sleeve 42. First sleeve 41 is identical or similar to first sleeve 23. Second sleeve 42 is identical or similar to second sleeve 24, except that second sleeve 42 is formed with an annular groove 42c on an outer circumferential portion thereof.

Figure 10:
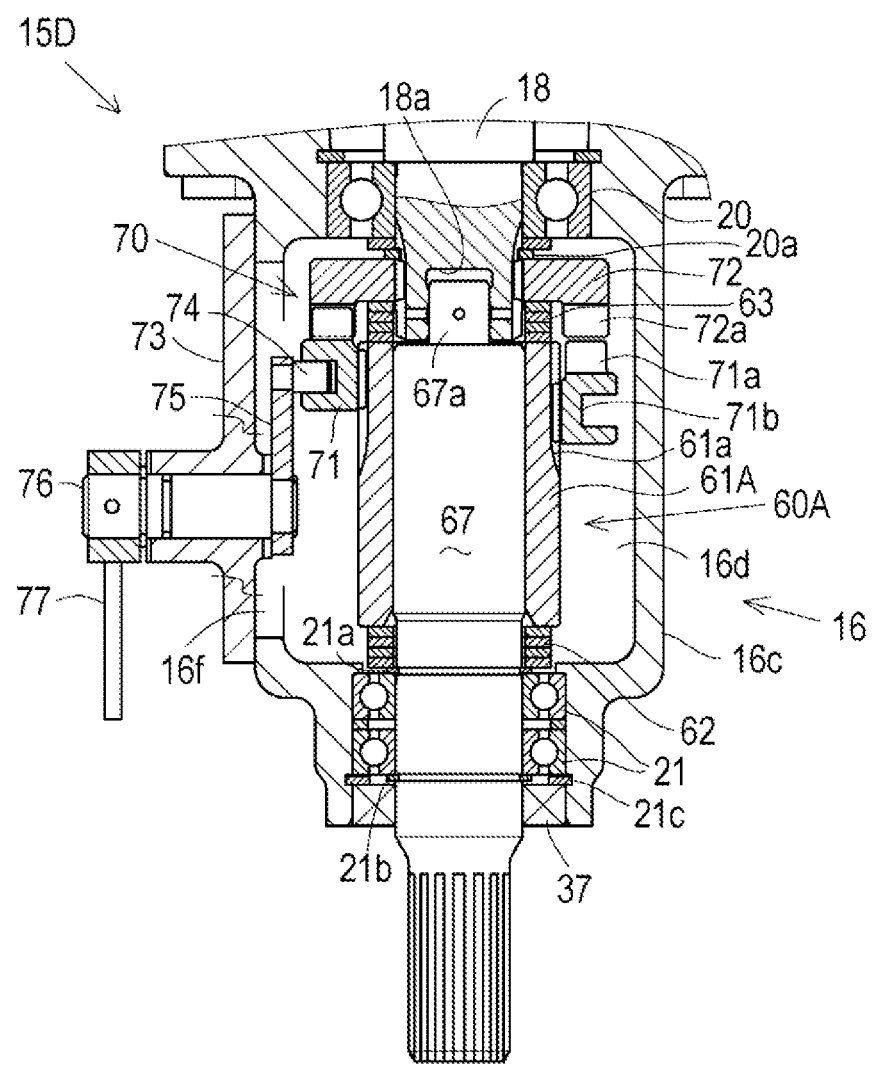
FIG. 10 is a fragmentary sectional plan view of a transaxle according to a fifth embodiment incorporating a torque limiter provided with a clutch.

In this regard, in a case where transaxle 15A includes a clutch operation mechanism similar to that of later-discussed transaxle 15D shown in FIG. 10, a projection similar to a projection 74 shown in FIG. 10 is fitted into annular groove 42c of second sleeve 42.

First sleeve 41 is inserted forward into second sleeve 42 so as to be pressed in second sleeve 42. Therefore, first and second sleeves 41 and 42 are assembled into a subassembly in which first and second sleeves 41 and 42 are radially pressed against each other to function as a torque limiter similar to torque limiter 22 including first and second sleeves 23 and 24.

In other words, on the assumption that the existence of annular groove 42c is ignored, if the subassembly of sleeves 41 and 42 as shown in FIG. 4 is spline-fitted to first and second input shafts 17 and 18 so as to be unmovable axially along first and second input shafts 17 and 18, the subassembly serves as axially immovable torque limiter 22 such as shown in FIG. 2. If the subassembly is spline-fitted to first and second input shafts 17 and 18 so as to be movable axially along first and second input shafts 17 and 18, the subassembly serves as axially movable clutch shifter 40 such as shown in FIG. 3 for selecting either 4WD or 2WD mode of UTV 1.

In correspondence to a target axial movement degree of clutch shifter 40, a clutch shifter chamber 17e formed in the rear portion of input shaft housing member 16c between bearings 20 and 21 has a sufficient fore-and-aft length, and the splines formed on the outer circumferential portions of first and second input shafts 17 and 18 have sufficient lengths.

Further, retainer ring 21a is fixed on first input shaft 17 immediately forward from bearing 21 so as to be able to contact a rear end of first sleeve 41, thereby locating clutch shifter 40 at a clutch-on position (i.e., a 4WD position). Retainer ring 20a is fixed on second input shaft 18 immediately rearward from bearing 20 so as to be able to contact a front end of second sleeve 42, thereby locating clutch shifter 40 at a clutch-off position (i.e., a 2WD position).

Further, due to the surface pressure radially applied mutually to sleeves 41 and 42, sleeves 41 and 42 can move together axially along first and second input shafts 17 and 18 without axially slipping relative to each other. In other words, clutch shifter 40 is movable axially along first and second input shaft 17 and 18 while keeping its configuration as a subassembly having a torque limiter function similar to torque limiter 22.

Alternatively, clutch shifter 40 may be configured such that an outer diameter of first sleeve 41 spline-fitted to rear first input shaft 17 is larger than that of second sleeve 42 spline-fitted to front second input shaft 18, and such that second sleeve 42 is inserted rearward into a forwardly open recess formed in first sleeve 41.

For convenience in illustration, in FIG. 3, clutch shifter 40 set at the clutch-on position as the foremost end of the slidable range of clutch shifter 40 is illustrated at a right side of first and second input shafts 17 and 18, and is designated by a reference numeral "40(ON)". Clutch shifter 40 set the clutch-off position as the rearmost end of the slidable range of clutch shifter 40 is illustrated at a left side of first and second input shafts 17 and 18, and is designated by a reference numeral "40(OFF)".

Regarding clutch shifter at the clutch-on position 40(ON), a spline-fitting state of first and second sleeves 41 and 42 to first and second input shafts 17 and 18 is similar to that of sleeves 23 and 24 of torque limiter 22 as shown in FIG. 2.

Specifically, second sleeve 42 is formed in a front portion thereof with a splined inner circumferential portion 42a, which is spline-fitted on the outer circumferential portion of second input shaft 18, and a splined inner circumferential portion 41a of first sleeve 41 in recess 42b is spline-fitted on the outer circumferential portion of first input shaft 17. In other words, first sleeve 41 is not rotatable relative to first input shaft 17 but is rotatable relative to second input shaft 18, and second sleeve 42 is not rotatable relative to second input shaft 18 but is rotatable relative to first input shaft 17.

In this state, since sleeves 41 and 42 (more specifically, the outer circumferential surface of first sleeve 41 and the inner circumferential surface of second sleeve 42 in recess 42b) contact each other so as to have the radial surface pressure therebetween similar to that between sleeves 23 and 24, sleeves 41 and 42 function as the torque limiter to limit a torque transmitted between sleeves 41 and 42 to a limiting value, thereby setting UTV 1 in the 4WD mode, except that when a torque transmitted between sleeves 41 and 42 increased by a load applied from differential yoke shafts 32 to second input shaft 18 exceeds the limiting value, sleeves 41 and 42 become rotatable relative to each other to interrupt the transmission of torque from being sleeve 41 to sleeve 42 (i.e., UTV 1 is temporarily shifted into the 2WD state).

Regarding clutch shifter at the clutch-off position 40(OFF), splined inner circumferential portion 41a of first sleeve 41 is still spline-fitted on the outer circumferential portion of first input shaft 17, and on the other hand, splined inner circumferential portion 42a of second sleeve 42 is removed rearward from the splined outer circumferential portion of second input shaft 18 but is spline-fitted onto the outer circumferential portion of first input shaft 17. In this way, neither first sleeve 41 nor second sleeve 42 is spline-fitted to second input shaft 18 but both first sleeve 41 and second sleeve 42 are spline-fitted to first input shaft 17.

Therefore, while the rotary power of first input shaft 17 is transmitted to sleeves 41 and 42 of clutch shifter 40, second input shaft 18 is isolated from the rotary power of clutch shifter 40 integral with the first input shaft 17, so that UTV 1 travels in the 2WD mode (by driving only rear wheels 9).

Figure 5:
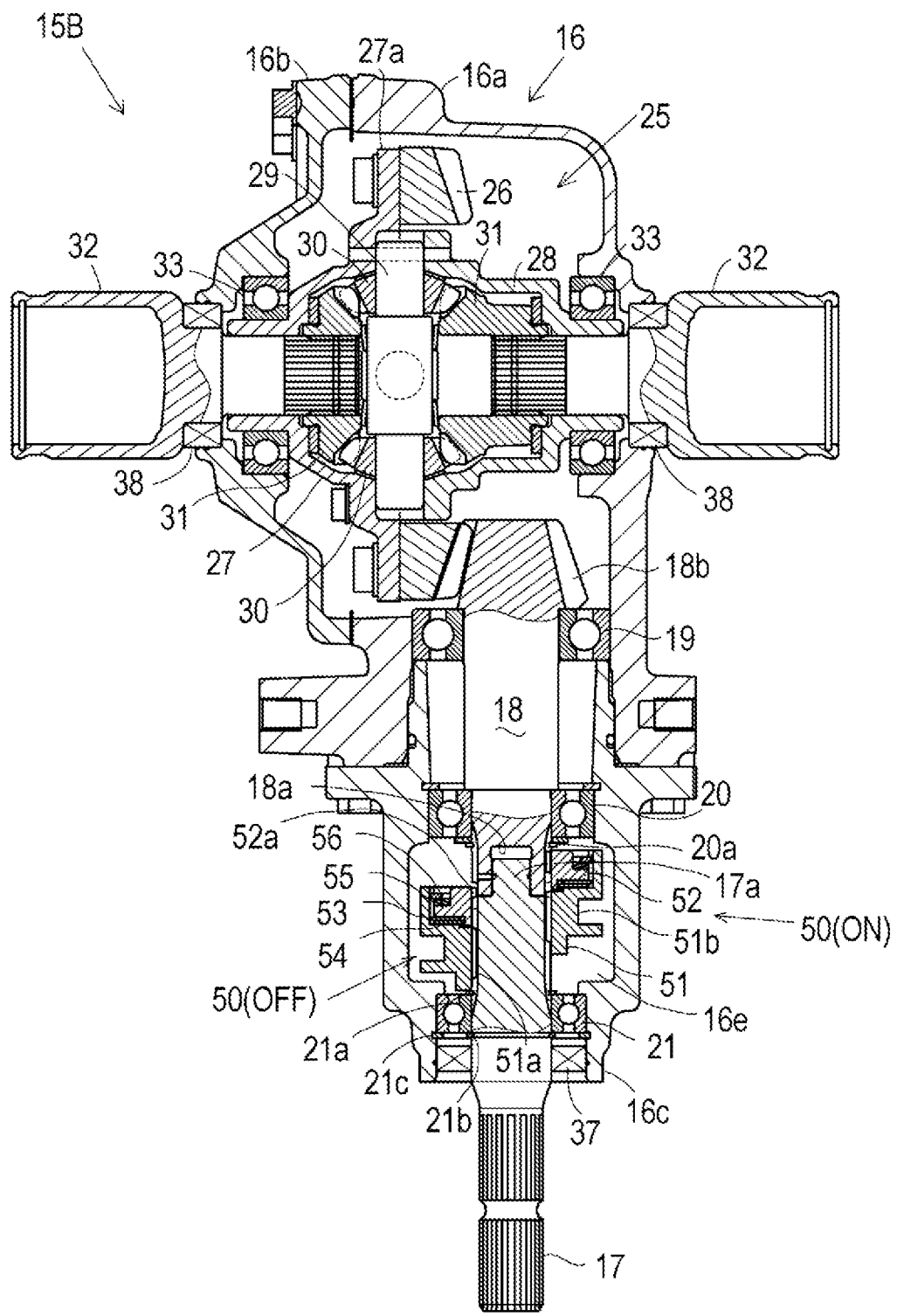
FIG. 5 is a sectional plan view of a front transaxle according to a third embodiment incorporating a clutch shifter including a torque limiter.
Figure 6:
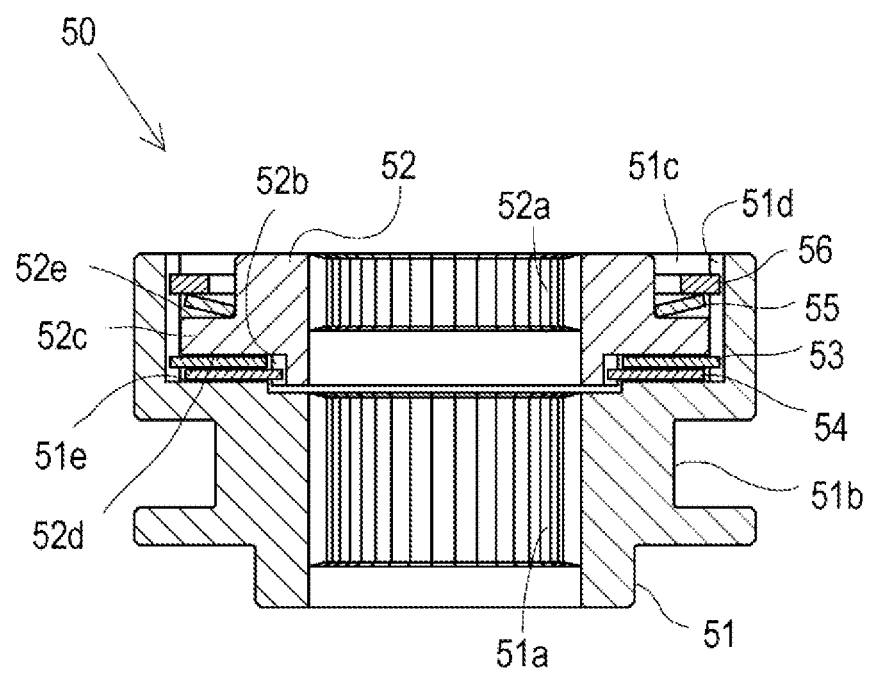
FIG. 6 is an enlarged sectional plan view of the clutch shifter shown in FIG. 5.

Referring to FIGS. 5 and 6, transaxle 15B will be described.

Transaxle 15B is substantially identical to transaxle 15 of FIG. 2 or transaxle 15A of FIGS. 3 and 4, except that transaxle 15B includes an alternative clutch shifter 50 having another torque limiter function.

Clutch shifter 50 is a subassembly including a first sleeve 51, a second sleeve 52, friction discs 53 and 54, a disc spring 55 and a retaining ring 56.

A rear portion of first sleeve 51 is formed with a splined inner circumferential portion 51a, and is formed on an outer circumferential portion thereof with an annular groove 51b. If transaxle 15B includes a clutch operation mechanism similar to that of later-discussed transaxle 15D shown in FIG. 10, a projection similar to projection 74 shown in FIG. 10 is fitted into annular groove 51b of first sleeve 51.

A front portion of first sleeve 51 is formed in a boss-shape having a forwardly open recess 51c. Friction disc 53 is fitted at an outer circumferential edge thereof to an inner circumferential portion 51d of recess 51c in such a way as to use key-fittings so as to be unrotatable relative to first sleeve 51 and axially slidable along first sleeve 51. First sleeve 51 is formed with a laterally vertical surface serving as a frictional pressed surface 51d, which defines a rear end of recess 51c and faces friction disc 53.

Second sleeve 52 is disposed in recess 51c of first sleeve 51. Second sleeve 52 is formed with a splined inner circumferential portion 52a extended coaxially forward from splined inner circumferential portion 51a of first sleeve 51.

Second sleeve 52 is formed with a flanged portion 52c having a laterally vertical rear end surface serving as a frictional pressed surface 52d, which faces friction disc 53 fitted to inner circumferential portion 51d of first sleeve 51.

Second sleeve 52 is formed with a diametrically small rear end portion, which is extended rearward from flanged portion 52c so as to have an outer circumferential portion 52b. Friction disc 54 is fitted at an inner circumferential edge thereof to outer circumferential portion 52b of recess 51c in such a way as to use key-fittings so as to be unrotatable relative to second sleeve 52 and axially slidable along second sleeve 52.

A lateral vertical surface of second sleeve 52 defining a front end of flanged portion 52c serves as a spring retaining surface 52e. Retaining ring 56 is fixed to inner circumferential portion 51d of first sleeve 51 forward from spring retaining surface 52e. Disc spring 55 is interposed between retaining ring 56 and spring retaining surface 52e.

Disc spring 55 presses flanged portion 52c of second sleeve 52 rearward so that frictional pressed surface 51e of first sleeve 51 and frictional pressed surface 52d of second sleeve 52 are pressed against each other via friction discs 53 and 54 by an axial pressure caused by the spring force of disc spring 55.

Alternatively, clutch shifter 50 may be configured such that second sleeve 52 is spline-fitted at a front inner circumferential portion thereof to front second input shaft 18, is formed on a front outer circumferential portion thereof with an annular groove similar to annular groove 51b, and is formed at a rear portion thereof with a rearwardly open recess in which first sleeve 51 is fitted to be spline-fitted at an inner circumferential portion thereof to rear first input shaft 17. In this alternative clutch shifter 50, friction discs 53 and 54, disc spring 55 and retaining ring 56 may be disposed in this recess to axially press first sleeve 51 against second sleeve 52 via friction discs 53 and 53.

For convenience in illustration, in FIG. 5, clutch shifter 50 set at a clutch-on position (i.e., a 4WD position) as the foremost end of the slidable range of clutch shifter 50 is illustrated at a right side of first and second input shafts 17 and 18, and is designated by a reference numeral "50(ON)". Clutch shifter 50 set a clutch-off position (i.e., a 2WD position) as the rearmost end of the slidable range of clutch shifter 50 is illustrated at a left side of first and second input shafts 17 and 18, and is designated by a reference numeral "50(OFF)".

Regarding clutch shifter at the clutch-on position 50(ON), splined inner circumferential portion 51a of first sleeve 51 is spline-fitted on the outer circumferential portion of first input shaft 17, and splined inner circumferential portion 52a of second sleeve 52 is spline-fitted on the outer circumferential portion of second input shaft 18. In other words, first sleeve 51 is not rotatable relative to first input shaft 17 but is rotatable relative to second input shaft 18, and second sleeve 52 is not rotatable relative to second input shaft 18 but is rotatable relative to first input shaft 17.

In this state, since frictional pressed surfaces 51e and 52d of sleeves 51 and 52 mutually receive an axial pressure via friction discs 53 and 54 so as to frictionally contact each other, second sleeve 52 drivingly connected to second input shaft 18 is normally rotated integrally with first sleeve 51 (i.e., without rotating relative to first sleeve 51) drivingly connected to first input shaft 17, so that the rotary power of first input shaft 17 driven by PTO shaft 5e is distributed between left and right front wheels 35 via clutch shifter 50, second input shaft 18 and differential unit 25.

Once front wheels 35 receive an excessive load from the earth, the rotation of second sleeve 52 is restrained by the backing overload transmitted to second input shaft 18 from differential yoke shafts 32 via differential unit 25 while keeping the rotation of first sleeve 51 integrated with first input shaft 17 driven by PTO shaft 5e, i.e., second sleeve 52 becomes rotatable relative to first sleeve 51, thereby protecting first input shaft 17 and the power train upstream of first input shaft 17.

In this way, clutch shifter at the clutch-on position 50(ON) functions as a torque limiter such as to interrupt a power transmission between first input shaft 17 and second input shaft 18 during the 4WD travel of UTV 1.

Regarding clutch shifter at the clutch-off position 50(OFF), splined inner circumferential portion 51a of first sleeve 51 is still spline-fitted on the outer circumferential portion of first input shaft 17, and on the other hand, splined inner circumferential portion 52a of second sleeve 52 is removed rearward from the splined outer circumferential portion of second input shaft 18 but is spline-fitted onto the outer circumferential portion of first input shaft 17. In this way, neither first sleeve 51 nor second sleeve 52 is spline-fitted to second input shaft 18 but both first sleeve 51 and second sleeve 52 are spline-fitted to first input shaft 17.

Therefore, while the rotary power of first input shaft 17 is transmitted to sleeves 51 and 52 of clutch shifter 50, second input shaft 18 is isolated from the rotary power of clutch shifter 50 integral with first input shaft 17, so that UTV 1 travels in the 2WD mode (by driving only rear wheels 9).

Referring to FIGS. 3 to 6, front transaxles 15A and 15B including respective clutch shifters 40 and 50 will now be collectively described.

UTV 1 equipped with either front transaxle 15A or 15B can travel in the 2WD mode (by driving only rear wheels 9) according to a driver's optional setting clutch shifter 40 or 50 at the clutch-off position.

Further, even during travel of UTV 1 in the 4WD mode (by driving all front and rear wheels 9 and 35) according to a driver's optional setting clutch shifter 40 and 50 at the clutch-on position, when front wheels 35 receives an excessive load from the earth, first input shaft 17 and second input shaft 18 become rotatable relative to each other automatically so that the 2WD travel of UTV 1 is instantly realized, thereby protecting first input shaft 17 and the power train upstream of first input shaft 17 from the backing load.

Moreover, each of clutch shifters 40 and 50 has a simple and economic structure because it uses a mechanical force, instead of an actuator using a hydraulic pressure, an air pressure, an electricity or so on, for ensuring the torque limiter function, i.e., to keep second sleeve 42 or 52 from being rotatable relative to first sleeve 41 or 51 unless a torque transmitted between first sleeve 41 or 51 and second sleeve 42 or 52 exceeds a limiting value.

The mechanical force for clutch shifter 40 is the mutual radial pressure (i.e., surface pressure) that first and second sleeves 41 and 42 possess in themselves by tightly inserting first sleeve 41 into second sleeve 42.

On the other hand, the mechanical force for clutch shifter 50 is the spring force of disc spring 55 that causes the axial frictional pressure mutually applied to first and second sleeves 51 and 52 with frictional pressed surfaces 51e and 52d contacting each other via friction discs 53 and 54.

More specifically, the mechanical force for each of clutch shifters 40 and 50 defines the limiting value of torque transmitted between first and second sleeves 41 and 42 or first and second sleeves 51 and 52. Therefore, the mechanical force is determined so as to make first and second sleeves 41 and 42 or first and second sleeves 51 and 52 unrotatable relative to each other to transmit power from first input shaft 17 to second input shaft 18 except that, when a torque transmitted between sleeves 41 and 42 or sleeves 51 and 52 increased by an overload applied from second input shaft 18 to second sleeve 42 or 52 exceeds the limiting value, first and second sleeves 41 and 42 or first and second sleeves 51 and 52 become rotatable relative to each other to interrupt the transmission of engine torque from first sleeve 41 or 51 to second sleeve 42 or 52 so as to isolate first sleeve 41 or 51 from the overload.

Therefore, first and second sleeves 41 and 42 or first and second sleeves 51 and 52, having been unrotatable relative to each other, become rotatable relative to each other to interrupt transmission of a torque between first second sleeve 41 and 42 or first and second sleeves 51 and 52 when the torque transmitted between sleeves 41 and 42 or sleeves 51 and 52 increased by a load from differential yoke shafts 32 to first input shaft 18 exceeds the limiting value defined by the mechanical force in clutch shifter 40 or 50 previously adjusted to have the predetermined limiting value.

The setting of the radial surface pressure mutually applied to first and second sleeves 41 and 42 serving as the mechanical force for clutch shifter 40 depends on determination of material of first and second sleeves 41 and 42, dimensioning of the outer diameter of first sleeve 41 and the inner diameter of second sleeve 42 defined by recess 42b, or so on. An axial insertion degree of first sleeve 41 into second sleeve 42 may be adjusted to adjust the radial surface pressure between first and second sleeves 41 and 42.

On the other hand, the setting of the axial frictional pressure mutually applied to first and second sleeves 51 and 52 serving as the mechanical force for clutch shifter 50 depends on selection of appropriate members serving as friction plates 53 and 54 and disc spring 55, dimensioning of a gap between frictional pressed surfaces 51e and 52d or a gap between spring retaining surface 52e and retaining ring 56, determination in number of friction discs 53 and 54 or disc spring 55.

Incidentally, each of clutch shifters 40 and 50 is configured as a subassembly in which first and second sleeves 41 and 42 or first and second sleeves 51 and 52 are kept engaging with each other to have the torque limiter function regardless of the slide of clutch shifter 40 or 50 along first input shaft 17 and second input shaft 18.

Therefore, the interruption of power transmission between first and second input shafts 17 and 18 by locating clutch shifter 40 or 50 at the clutch-off position does not rely on separation of first sleeve 41 or 51 from second sleeve 42 or 52 to make first and second sleeves 41 and 42 or first and second sleeves 51 and 52 rotatable relative to each other, but relies on separation of one of first and second input shafts 17 and 18 from both first and second sleeves 41 and 42 or both first and second sleeves 51 and 52 to make the one of first and second input shafts 17 and 18 rotatable relative to both first and second sleeves 41 and 42 or both first and second sleeves 51 and 52.

In this regard, according to each of the embodiments of front transaxles 15A and 15B shown in FIGS. 3 and 5, when each of clutch shifters 40 and 50 is set at the clutch-off position rearward from the clutch-on position, both first sleeve 41 or 51 and second sleeve 42 or 52 are drivingly connected to first input shaft 17 by spline-fitting so as to be unrotatable relative to first input shaft 17, and are separated from second input shaft 18 so as to be rotatable relative to second input shaft 18.

Alternatively, a clutch-off position of clutch shifter 40 or 50 may be located forward from its clutch-on position, so that, when clutch shifter 40 or 50 is set at this clutch-off position, both first sleeve 41 or 51 and second sleeve 42 or 52 are separated from first input shaft 17 so as to be rotatable relative to first input shaft 17, and are drivingly connected to second input shaft 18 by spline-fitting so as to be unrotatable relative to second input shaft 18.

Figure 7:
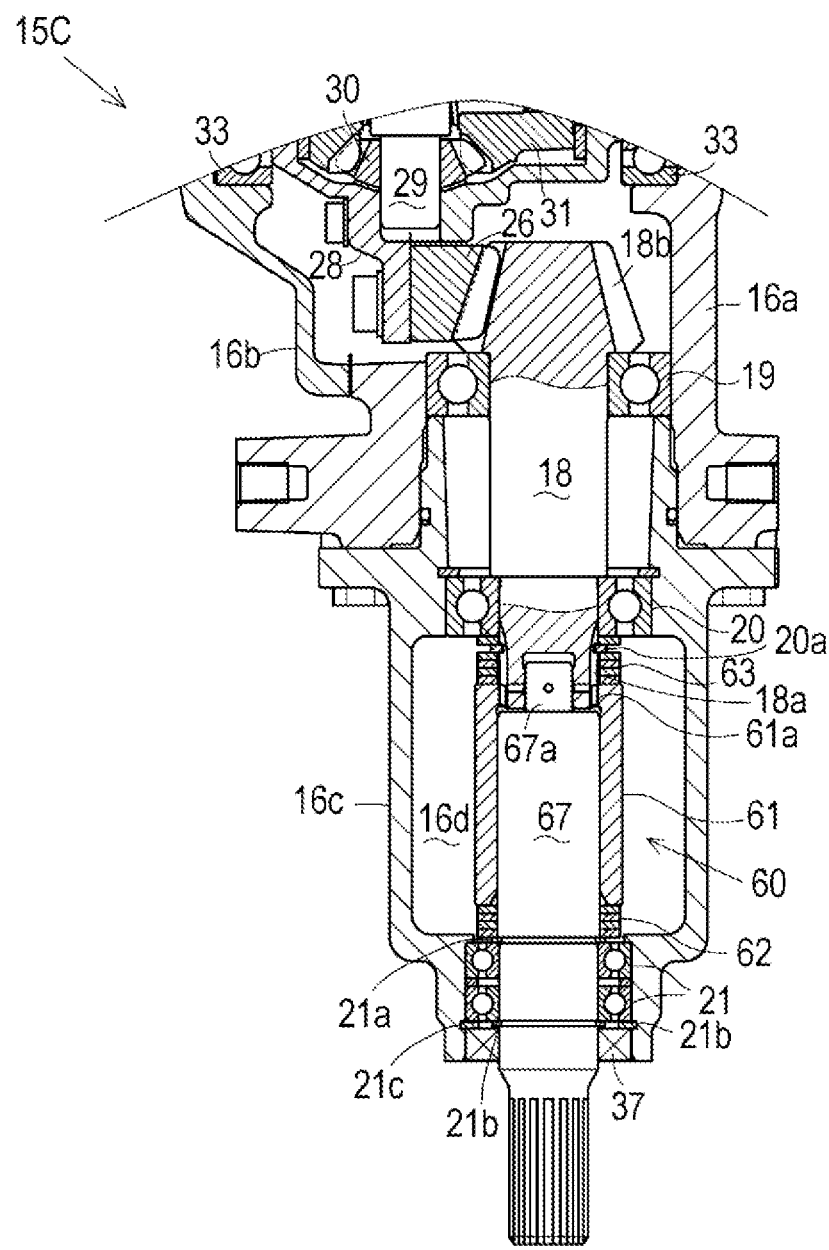
FIG. 7 is a fragmentary sectional plan view of a transaxle according to a fourth embodiment incorporating a torque limiter.
Figure 8:
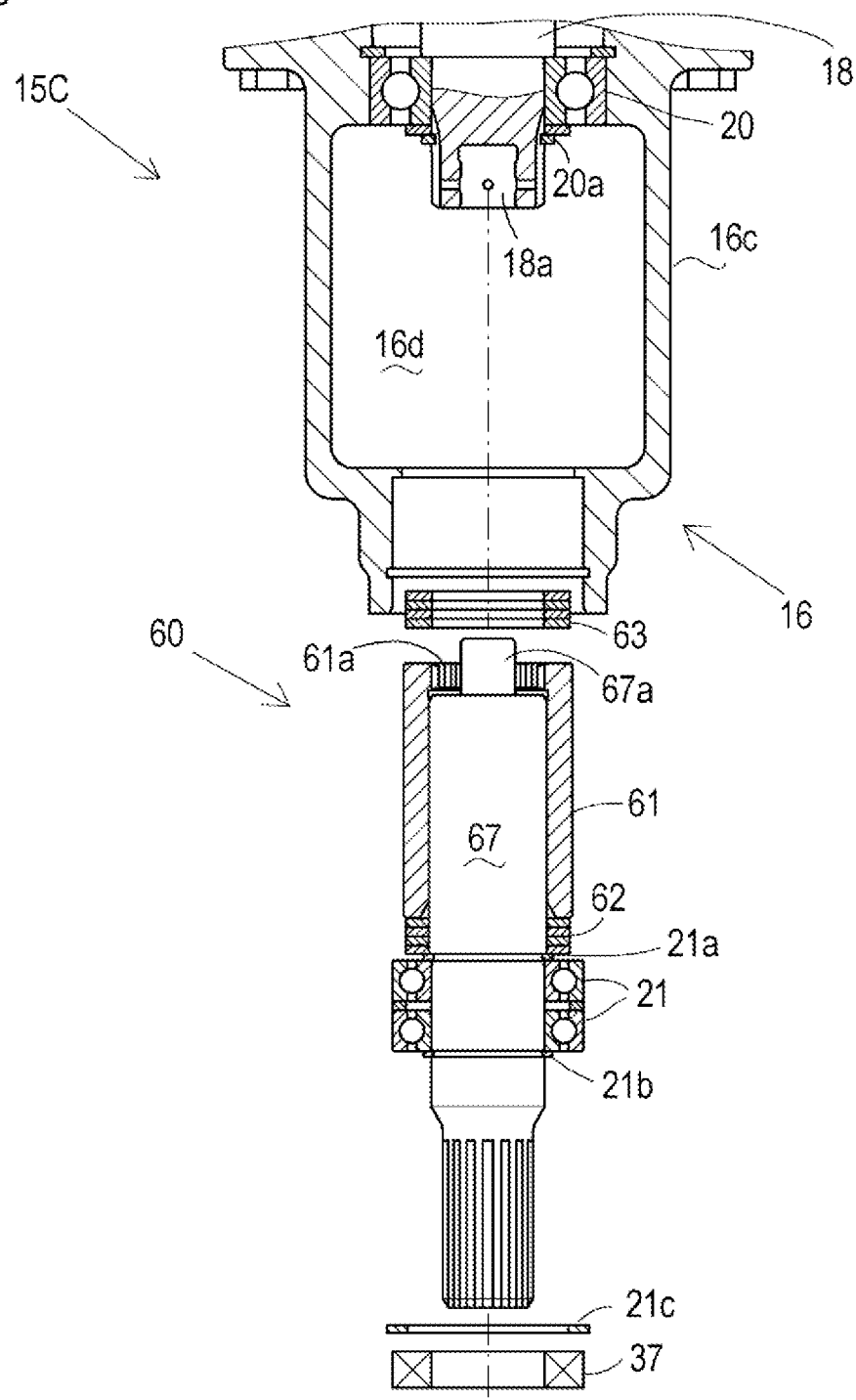
FIG. 8 is a fragmentary sectional plan view of the transaxle shown in FIG. 7 when the transaxle is disassembled to remove the torque limiter therefrom.
Figure 9:
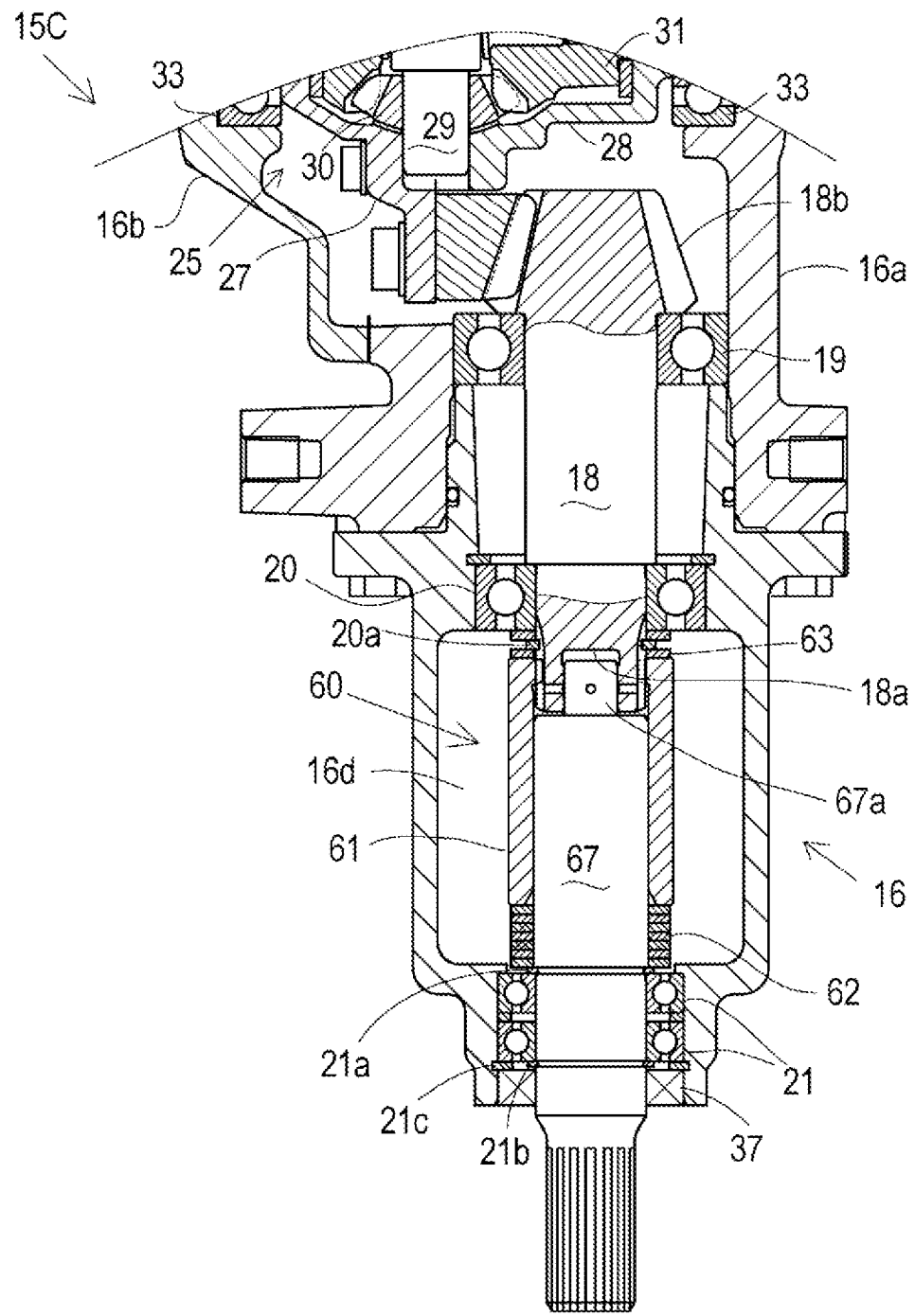
FIG. 9 is a fragmentary sectional plan view of the same transaxle as that shown in FIG. 7 except that the torque limiter is modified to reduce a capacity.

Referring to FIGS. 7 to 9, transaxle 15C will be described.

Front transaxle 15C incorporates a torque limiter 60 that is a subassembly including an alternative first input shaft 67 and a sleeve 61. Similar to first input shaft 17, first input shaft 67 is connected to second input shaft 18 rotatably relative to second input shaft 18 by fitting a front projection 67a formed on a front end of first input shaft 67 into rear recess 18a of second input shaft 18.

In torque limiter 16d, first input shaft 61 serving as a part of torque limiter 60 has a smooth outer circumferential surface that is not splined, in comparison with first input shaft 17 having the splined outer circumferential portion that is spline-fitted to splined inner circumferential portion 21a, 41a or 51a of first sleeve 21, 41 or 51. Correspondingly, sleeve 61 has a smooth inner circumferential surface that is not splined, except that sleeve 61 is formed at a front end portion thereof with a splined inner circumferential edge 61a.

First input shaft 67 is tightly inserted forward into sleeve 61 so that the smooth outer circumferential surface of first input shaft 67 and the smooth inner circumferential surface of sleeve 61 are radially pressed against each other. As understood from FIG. 8, the subassembly serving as torque limiter 60 is completed by pressing first input shaft 67 into sleeve 61, before the subassembly is installed into torque limiter chamber 16d in housing 16.

When torque limiter 60 is installed into torque limiter chamber 16d, front projection 67a of first input shaft 67 is inserted into rear recess 18a of second input shaft 18, thereby connecting first input shaft 67 to second input shaft 18 rotatably relative to second input shaft 18. At this time, a splined front inner circumferential portion 61a of sleeve 61 is spline-fitted onto the splined rear outer circumferential portion of second input shaft 18, thereby connecting sleeve 61 coaxially to second input shaft 18 unrotatably relative to second input shaft 18.

Referring to FIGS. 7 and 8, to locate torque limiter 60 immovably in the axial direction of input shafts 67 and 18, rear spacers (washers) 62 are fitted around first input shaft 67 and are interposed between retaining ring 21a and a rear end of sleeve 61. Also, front spacers (washers) 63 are fitted around second input shaft 18 and are interposed between retaining ring 20a and a front end of sleeve 61.

Incidentally, in this embodiment, two bearings 21 are provided in the rear portion of input shaft housing member 16c to journal first input shaft 67. The number of bearings 21 is not limited if only front retaining ring 21a is disposed at the front end of foremost bearing 21 of bearings 21, and rear retaining ring 21b is disposed at the rear end of rearmost bearing 21 of bearings 21. The same is stated regarding bearing 20 and retaining ring 20a.

As understood from FIG. 8, the subassembly serving as torque limiter 60 detachable from housing 16 of front transaxle 15C includes bearings 21, front and rear retaining rings 21a, and rear spacers 62, fitted on first input shaft 67 immovably in the axial direction of first input shaft 67.

Front spacers 63 are fitted on the rear outer circumferential portion of second input shaft 18 before the subassembly serving as torque limiter 60 is inserted into torque limiter chamber 16d in input shaft housing member 16c.

Spacer 21c and fluid seal 37 are fitted into the rear end portion of input shaft housing member 16c after torque limiter 60 is installed in torque limiter chamber 16d by fitting projection 67a into recess 18a, and by spline-fitting splined front inner circumferential edge 61a of sleeve 61 to the rear portion of second input shaft 18.

On the contrary, after fluid seal 37 and spacer 21c are removed from input shaft housing member 16c of housing 16, by pulling first input shaft 67 axially outward from housing 16 (i.e., rearward from the rear end of input shaft housing member 16c), projection 67a can be withdrawn from recess 18a, and the subassembly serving as torque limiter 60, including first input shaft 67, sleeve 61, spacer 62, and bearings 21, can be removed outward from housing 16 while leaving spacer 63 on second input shaft 18 in torque limiter chamber 16d.

Torque limiter 60 is advantageous in reducing the number of component members because first input shaft 67 serves as a part of torque limiter 60. More specifically, first input shaft 67 of torque limiter 60 serves as a member pressing sleeve 61 in the centrifugally radial direction, which is similar to first sleeve 23 of torque limiter 22 pressing second sleeve 24 in the centrifugally radial direction.

Sleeve 61 and first input shaft 67 have sufficient axial lengths such as to ensure required areas of circumferential surfaces thereof contacting each other, thereby ensuring a sufficient radial surface pressure between sleeve 61 and first input shaft 67 corresponding to a required capacity of torque limiter 60. When first input shaft 67 is inserted into sleeve 61, an axial insertion degree of first input shaft 67 into sleeve 61 can be adjusted in correspondence to the required capacity of torque limiter 60.

In this regard, if torque limiter 60 requires a smaller capacity such as to have a quicker response of interrupting the transmission of engine torque against load on front wheels 35 (i.e., differential yoke shafts 32), the axial insertion degree of first input shaft 67 into sleeve 61 is reduced so as to reduce the radial pressure between sleeve 61 and first input shaft 67. If torque limiter 60 requires a greater capacity such as to have a slower response against the load on front wheels 35, the axial insertion degree of first input shaft 67 into sleeve 61 is increased.

Torque limiter 60 shown in FIG. 9 is configured to have a smaller capacity than that of torque limiter 60 shown in FIG. 7. In this regard, the axial insertion degree of first input shaft 67 into sleeve 61 of torque limiter 60 shown in FIG. 9 is less than that of torque limiter 60 shown in FIG. 7.

In this regard, as the axial insertion degree of first input shaft 67 into sleeve 61 is reduced, an axial projection degree of the front end portion of sleeve 61 forward from the front end of first input shaft 67 (except for front projection 67a) is increased.

Therefore, torque limiter 60 having the smaller capacity such as shown in FIG. 9 is provided with more rear spacers 62 than those of torque limiter 60 having the greater capacity such as shown in FIG. 7, and is provided with fewer front spacers 63 (in the embodiment shown in FIG. 9, only single front spacer 63) than those of torque limiter 60 having the greater capacity such as shown in FIG. 7 (or front spacer 63 is eliminated) in correspondence to the increase of rear spacers 62 in number, thereby being located in torque limiter chamber 16d immovably in the axial direction of first and second input shafts 67 and 18.

Referring to FIG. 10, transaxle 15D will be described.

Transaxle 15D incorporates a torque limiter 60A including first input shaft 67 and a sleeve 61A in torque limiter chamber 16d inside of housing 16. Transaxle 15D is substantially identical to transaxle 15C of FIG. 7, except that a clutch 70 is interposed between torque limiter 60A and second input shaft 18 so as to switch the driving mode of UTV 1 between the 2WD mode and the 4WD mode.

Sleeve 61A of torque limiter 60A is identical or similar to sleeve 61 of torque limiter 60, except that sleeve 61A is formed with a splined front outer circumferential portion 61a. Incidentally, an axial length of sleeve 61A is set so as to reduce a forward projection degree of sleeve 61A (except for projection 67a) from the front end of first input shaft 67 in consideration that a later-discussed clutch member 72 is provided around the rear portion of second input shaft 18 in torque limiter chamber 16d.

First input shaft 67 is inserted forward into sleeve 61A so as to be pressed in sleeve 61A, so that the outer circumferential surface of first input shaft 67 is pressed against an inner circumferential surface of sleeve 61A in the centrifugal radial direction of first input shaft 67. Therefore, first input shaft 67 and sleeve 61A function as torque limiter 60A similar to torque limiter 60 including first input shaft 67 and sleeve 61.

A clutch member 71 is spline-fitted at an inner circumferential portion thereof to splined front outer circumferential portion 61a of sleeve 61A so that clutch member 71 is connected to sleeve 61A unrotatably relative to sleeve 61A.

On the other hand, a clutch member 72 is spline-fitted at an inner circumferential portion thereof to the rear outer circumferential portion of second input shaft 18 in torque limiter chamber 16d forward from clutch member 71 so that clutch member 72 is connected to second input shaft 18 unrotatably relative to second input shaft 18.

Clutch members 71 and 72 are formed with respective clutch teeth 71a and 72a so that clutch members 71 and 72 constitute dog clutch 70. One of clutch members 71 and 72 is slidable in the axial direction of first and second input shafts 67 and 18, and the other of clutch members 71 and 72 is immovable in the axial direction.

In this embodiment, clutch member 71 is slidable along splined front outer circumferential portion 61a of sleeve 61A in the axial direction of first input shaft 67. Clutch member 72 is engaged to second input shaft 18 immovably in the axial direction.

For convenience in illustration, in FIG. 10, a portion of clutch member 71 appearing leftward from first input shaft 67 is illustrated as clutch member 71 disposed at a clutch-on (4WD) position where clutch teeth 71a of clutch member 71 mesh with clutch teeth 72a of clutch member 72 so as to engage clutch 70.

Another portion of clutch member 71 appearing rightward from first input shaft 67 is illustrated as clutch member 71 disposed at a clutch-off (2WD) position where clutch teeth 71a of clutch member 71 are separated from clutch teeth 72a of clutch member 72 so as to disengage clutch 70.

Rear spacers 62 are provided around first input shaft 67 so as to be interposed between front retaining ring 21a at the front end of foremost bearing 21 of bearings 21 and a rear end of sleeve 60A. On the other hand, front spacers 63 are disposed around the rear portion of second input shaft 18 rearward from clutch member 72.

Therefore, sleeve 61A of torque limiter 60A is clamped between rear spacers 62 and front spacers 63 immovably in the axial direction of first input shaft 67, and clutch member 72 of clutch 70 is clamped between front spacers 63 and retaining ring 20a immovably in the axial direction of second input shaft 18.

To adjust the capacity of torque limiter 60A constituted by first input shaft 67 and sleeve 61A, the ratio in number of front spacers 63 to rear spacers 62 can be adjusted to make the axial insertion degree of first input shaft 67 into sleeve 61A correspondent to the required capacity of torque limiter 60A.

Alternatively, clutch member 72 may be axially slidable along second input shaft 18, and clutch member 71 may be engaged to sleeve 61A immovably in the axial direction of first input shaft 67.

In this regard, for example, a stopper may be provided on sleeve 61A to axially immovably retain clutch member 71 spline-fitted to sleeve 61A at the position defined in FIG. 10 as the clutch-off position. To make a slidable range of clutch member 72 spline-fitted to second input shaft 18 rearward from its position shown in FIG. 10, the number of front spacers 63 may be reduced to space the front end of sleeve 61A rearward from clutch member 72.

Accordingly, the position of clutch member 72 shown in FIG. 10 is defined as a clutch-off position of clutch member 72 in which clutch teeth 72a of clutch member 72 disengage from clutch teeth 71a of clutch member 71 axially immovably retained at the position defined in FIG. 10 as the clutch-off position, and an unshown position of clutch member 72 rearward from its position shown in FIG. 10 is defined as a clutch-on position of clutch member 72 in which clutch teeth 72a of clutch member 72 engage with clutch teeth 71a of clutch member 71.

Alternatively, instead of clutch members 71 and 72 constituting dog clutch 70, only a single clutch shifter may be interposed between the splined rear outer circumferential portion of second input shaft 18 and splined front outer circumferential portion 61a of sleeve 61A.

In this regard, the clutch shifter is axially slidable along the splined portions of second input shaft 18 and sleeve 61A. When the clutch shifter is spline-fitted to either sleeve 61A or second input shaft 18, second input shaft 18 is isolated from the driving force of torque limiter 60A including first input shaft 67 so as to set UTV 1 in the 2WD mode. When the clutch shifter is disposed across a gap between sleeve 61A and second input shaft 18 so as to be spline-fitted to both sleeve 61A and second input shaft 18, second input shaft 18 is drivingly connected to torque limiter 60A including first input shaft 67 so as to set UTV 1 in the 4WD mode.

Referring to FIG. 10, a clutch operation mechanism for sliding clutch member 71 of clutch 70 in front transaxle 15D will be described.

A sidewall of input shaft housing member 16c is formed therethrough with an opening 16f between torque limiter chamber 16d and the outside thereof. A cover plate 73 is fixed to an outer surface of the sidewall of input shaft housing member 16c to cover opening 16f. Cover plate 73 is formed with a boss in which a lateral clutch arm shaft 76 is pivotally supported.

A clutch operation arm 77 is fixed at a basal end portion thereof onto an outer end of clutch arm shaft 76 projecting outward from the boss of cover plate 73. A tip portion of clutch operation arm 77 is operatively connected to a driving mode selection manipulator (not shown), e.g., a switch or a lever, provided in UTV 1 to select either the 4WD mode or the 2WD mode.

An inner end of clutch arm shaft 76 projects from the boss of cover plate 78 into opening 16f. An arm 75 is disposed in torque limiter chamber 16d and opening 16f and is fixed at an end portion thereof to the inner end of clutch arm shaft 76. A projection 74 projects from another end portion of arm 75 into torque limiter chamber 16d.

An annular groove 71b is formed on an outer circumferential portion of axially slidable clutch member 71. Projection 74 is fitted into annular groove 71b. Therefore, by rotating clutch operation arm 77, clutch arm shaft 76, arm 75 and projection 74 are rotated together centered on an axis of clutch arm shaft 76 so as to slide clutch member 71 axially along sleeve 61A. Alternatively, if clutch member 72 serves as an axially slidable clutch member as mentioned above, projection 74 may be fitted into an annular groove formed on clutch member 72.

Cover plate 73, projection 74, arm 75, clutch arm shaft 76, and clutch operation arm 77 are assembled together with clutch member 71 into a subassembly serving as the clutch operation mechanism for shifting clutch member 71.

Therefore, only by attaching or detaching cover plate 73 to and from the above-mentioned sidewall of input shaft housing member 16c, the operation mechanism with clutch member 71 can easily be installed or removed into and from housing 16, while clutch member 72 is placed on second input shaft 18.

On the other hand, first input shaft 67, sleeve 61A, spacers 62, bearings 21 and retaining rings 21a and 21b are also assembled together into a subassembly serving as torque limiter 60A, similar to the subassembly serving as torque limiter 60. Therefore, the subassembly serving as torque limiter 60A can be easily installed or removed into and from torque limiter chamber 16d in housing 16.

For example, regarding removal of the subassembly serving as torque limiter 60A from housing 16, after fluid seal 37 and spacer 21c are removed from housing 16, only by pulling first input shaft 67 axially outward from housing 16, projection 67a is withdrawn from recess 18a, and splined front outer circumferential portion 61a of sleeve 61A axially slides along the splined inner circumferential portion of clutch member 71 so as to withdraw sleeve 61A on first input shaft 67 from clutch member 71, thereby easily removing the subassembly serving as torque limiter 60A outward from housing 16.

It is further understood by those skilled in the art that the foregoing description is given to preferred embodiments of the disclosed apparatus and that various changes and modifications may be made in the invention without departing from the scope thereof defined by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A transaxle comprising:
   a first input shaft;

a second input shaft extended coaxially to the first input shaft;
an output shaft drivingly connected to the second input shaft;
a torque limiter interposed between the first input shaft and the second input shaft; and
a housing incorporating the first and second input shafts, the output shaft and the torque limiter,
wherein the torque limiter includes first and second sleeves,
wherein the first sleeve is connected to the first input shaft unrotatably relative to the first input shaft,
wherein the second sleeve is connected to the second input shaft unrotatably relative to the second input shaft, and
wherein the torque limiter is configured such that the first and second sleeves are layered in a radial direction of the first and second input shafts and contact and press each other with a radial surface pressure therebetween to limit a torque transmitted between the first and second sleeves to a limiting value.

2. The transaxle according to claim 1,
wherein the torque limiter is shiftable in an axial direction of the first and second input shafts between a first position and a second position while the radial surface pressure keeps the first and second sleeves from moving relative to each other in the axial direction of the first and second input shafts,
wherein, when the torque limiter is located at the first position, the first sleeve is connected to the first input shaft unrotatably relative to the first input shaft, and the second sleeve is connected to the second input shaft unrotatably relative to the second input shaft, and
wherein, when the torque limiter is located at the second position, both the first and second sleeves are separated from one of the first and second input shafts so as to be rotatable relative to the one of the first and second input shafts.

3. A transaxle comprising:
a first input shaft;
a second input shaft extended coaxially to the first input shaft;
an output shaft drivingly connected to the second input shaft;
a sleeve connected to the second input shaft unrotatably relative to the second input shaft; and
a housing incorporating the first and second input shafts, the output shaft and the sleeve,
wherein the first input shaft is fitted into the sleeve so that the first input shaft and the sleeve are layered in a radial direction of the first input shaft and contact each other with a radial surface pressure therebetween to limit a torque transmitted between the first input shaft and the sleeve to a limiting value.

4. The transaxle according to claim 3, further comprising:
a first clutch member disposed in the housing and connected to one of the sleeve and the second input shaft unrotatably relative to the one of the sleeve and the second input shaft; and
a second clutch member disposed in the housing and connected to the other of the sleeve and the second input shaft unrotatably relative to the other of the sleeve and the second input shaft,
wherein one of the first and second clutch members is immovable in the axial direction of the first and second input shafts, and
wherein the other of the first and second clutch members is movable in the axial direction of the first and second input shafts so as to be shiftable between a clutch-on position to engage the first and second clutch members with each other and a clutch-off position to disengage the first and second clutch members from each other.

5. The transaxle according to claim 3,
wherein the limiting value is adjustable by changing an axial insertion degree of the first input shaft into the sleeve.

6. A transaxle comprising:
a first input shaft;
a second input shaft extended coaxially to the first input shaft;
an output shaft drivingly connected to the second input shaft; and
a clutch shifter including first and second members,
wherein the clutch shifter is shiftable between a clutch-on position and a clutch-off position,
wherein when the clutch shifter is set at the clutch-on position, the first member is drivingly connected to the first input shaft, the second member is drivingly connected to the second input shaft, and the first and second members engage with each other by a mechanical force such as to limit a torque transmitted between the first and second members to a limiting value, and
wherein when the clutch shifter is set at the clutch-off position, both the first and second members are drivingly isolated from one of the first and second input shafts.

7. The transaxle according to claim 6,
wherein one of the first and second members is inserted into the other of the first and second members so that the first and second members are pressed against each other by a pressure in a radial direction of the first and second input shafts serving as the mechanical force.

8. The transaxle according to claim 6,
wherein the first and second members are pressed against each other by a pressure in an axial direction of the first and second input shafts serving as the mechanical force.

9. The transaxle according to claim 8,
wherein the clutch shifter further includes:
a friction member interposed between axial end surfaces of the first and second sleeves, and
a biasing member biasing the first and second sleeves toward each other via the friction member.

* * * * *